US010926636B2

(12) United States Patent
Losch et al.

(10) Patent No.: US 10,926,636 B2
(45) Date of Patent: Feb. 23, 2021

(54) CONTROL SYSTEM FOR AN AGRICULTURAL WORKING VEHICLE

(71) Applicant: CLAAS Selbstfahrende Erntemaschinen GmbH, Harsewinkel (DE)

(72) Inventors: Michael Losch, Versmold (DE); Sebastian Neu, Bad Laer (DE); Christian Giesguth, Lichtenau (DE); Carsten Grove, Beelen (DE); Alexander Kirchbeck, Drensteinfurt (DE); Christoph Dierkes, Ibbenbueren (DE); Dirk Lahmann, Halle/Westf. (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 100 days.

(21) Appl. No.: 16/196,157

(22) Filed: Nov. 20, 2018

(65) Prior Publication Data
US 2019/0152321 A1 May 23, 2019

(30) Foreign Application Priority Data

Nov. 22, 2017 (DE) .......................... 102017127560.6

(51) Int. Cl.
B60K 35/00 (2006.01)
B60K 37/06 (2006.01)
(Continued)

(52) U.S. Cl.
CPC .............. B60K 35/00 (2013.01); A01B 76/00 (2013.01); B60K 37/06 (2013.01); G06F 3/048 (2013.01);
(Continued)

(58) Field of Classification Search
CPC .. B60K 35/00; B60K 37/06; B60K 2370/137; B60K 2370/117; B60K 2370/151;
(Continued)

(56) References Cited

U.S. PATENT DOCUMENTS 6,932,183 B2 8/2005 Jeppe et al.
2014/0298228 A1 10/2014 Meegan et al.
(Continued)

FOREIGN PATENT DOCUMENTS

DE 102009034154 A1 2/2011
EP 1288763 A2 3/2003
(Continued)

OTHER PUBLICATIONS

European Search Report dated Mar. 21, 2019 in European Application No. 18198102 with English translation of the relevant parts.

Primary Examiner — Rodney A Butler
(74) Attorney, Agent, or Firm — Collard & Roe, P.C.

(57) ABSTRACT

A control system for an agricultural working machine has a control device which is connected, in terms of signals, to a display unit, a ground speed control lever, and a control panel, wherein at least the ground speed control lever comprises multiple control elements. The display unit is designed as a touch-sensitive screen including one or multiple visualization panes and several virtual control elements. A preferred quick-select function—from a plurality of different quick-select functions for adjusting a performance parameter of the working machine—is assigned to one of the control elements of the display unit, of the ground speed control lever, and of the control panel, the performance parameter being depictable with the aid of the display unit upon activation. The quick-select function can be activated with the aid of the display unit, and/or the ground speed control lever, and/or the control element.

10 Claims, 4 Drawing Sheets

(51) Int. Cl.
*A01B 76/00* (2006.01)
*G06F 3/048* (2013.01)

(52) U.S. Cl.
CPC ... *B60K 2370/111* (2019.05); *B60K 2370/115* (2019.05); *B60K 2370/117* (2019.05); *B60K 2370/119* (2019.05); *B60K 2370/137* (2019.05); *B60K 2370/151* (2019.05); *B60K 2370/61* (2019.05)

(58) Field of Classification Search
CPC ........ B60K 2370/119; B60K 2370/115; B60K 2370/61; B60K 2370/111; G06F 3/048; A01B 76/00
See application file for complete search history.

(56) References Cited

U.S. PATENT DOCUMENTS

| | | | |
|---|---|---|---|
| 2014/0298241 A1 | 10/2014 | Meegan et al. | |
| 2014/0298259 A1 | 10/2014 | Meegan et al. | |
| 2019/0047620 A1* | 2/2019 | Iwamura | B62D 11/06 |

FOREIGN PATENT DOCUMENTS

| | | | |
|---|---|---|---|
| EP | 2277369 A1 * | 1/2011 | G05G 1/06 |
| WO | 2014160917 A1 | 10/2014 | |

* cited by examiner

CONTROL SYSTEM FOR AN AGRICULTURAL WORKING VEHICLE

CROSS REFERENCE TO RELATED APPLICATIONS

This application claims priority under 35 USC § 119 of German Patent Application No. 102017127560.6, filed on Nov. 22, 2017, the disclosure of which is herein incorporated by reference.

BACKGROUND OF THE INVENTION

The present invention relates to a control system for an agricultural working machine. Moreover, the present invention relates to an agricultural working machine, in particular, a self-propelled harvesting machine.

DE 10 2009 034 154 A1 describes a control system comprising a ground speed control lever designed as a multi-functional handle, on the grip part of which several control elements are situated. With the aid of the multi-functional handle and the control elements situated on the grip part, settings of an agricultural working machine, which influence the operating performance, can be adjusted and changed. The multi-functional handle described in DE 10 2009 034 154 A1 is distinguished by an ergonomic design which is to provide for non-fatiguing operation of the working machine.

EP 1 288 763 B1 describes a control system for an agricultural working machine of the type mentioned at the outset. The control system comprises a control device which is connected, in terms of signals, to a display unit, a ground speed control lever designed as a multi-functional handle, and a control panel. The multi-functional handle comprises several multiple-use control elements which are designed as rocker or toggle switches, to which working machine-specific, first control functions are assigned for actuating working units which are frequently actuated during the on-going operation of the working machine. In addition, a selection/transfer control element is provided, to which two further secondary control functions for actuating working units are assigned in addition to a first control function, the secondary control functions corresponding to an actuation of a working unit which is carried out less frequently and, therefore, the secondary control functions are implemented by actuating control elements situated on a control panel which is situated at a distance from the multi-functional handle. These control functions can be selected by varying the switch position of the selection/transfer control element. Depending on the particular switch position, the selection/transfer control element transfers a control function corresponding to the switch position to one of the multiple-use control elements on the multi-functional handle, and so, by way of this multiple-use control element, one of the control functions predefinable by way of the selection/transfer control element can be optionally carried out in order to actuate a working unit of the working machine.

SUMMARY OF THE INVENTION

Proceeding from the aforementioned related art, the problem addressed by the present invention is that of providing a control system for an agricultural working machine, which is distinguished by a more efficient operability.

This problem is solved according to the invention by a control system for an agricultural working machine that comprises a control device which is connected, in terms of signals, to a display unit, a ground speed control lever, and a control panel, wherein at least the ground speed control lever comprises multiple control elements. In order to achieve a more efficient operability, it is provided according to the invention that the display unit is designed as a touch-sensitive screen including one or multiple visualization panes as well as several virtual control elements, wherein a preferred quick-select function—from a plurality of different quick-select functions for adjusting a performance parameter of the working machine assigned to a particular quick-selection function—is assigned, in a pre-configured manner, to one of the control elements of the display unit, of the ground speed control lever, and of the control panel, the performance parameter being depictable with the aid of the display unit upon activation, wherein the quick-select function assigned to the particular control element can be activated with the aid of the display unit, and/or the ground speed control lever, and/or the control element. The preconfiguration of the loading of the particular control element with a preferred quick-select function preferably takes place in this case with the aid of the display unit. The activation of the preferred quick-select function therefore takes place with the aid of a control component which comprises the display unit, the ground speed control lever, and/or the control panel. The assignment of a preferred quick-select function to the different control components of the control system, i.e., the display unit, the ground speed control lever, and the control panel, makes it possible for an operator to quickly and directly access the performance parameters represented by the preferred quick-select function in different operating situations of the working machine, whereby the setting or adjustment of this performance parameter of a working unit of the working machine is simplified and made more comfortable.

In one preferred refinement, the preconfigured loading of the particular control element with the preferred quick-select function can be changeable with the aid of the display unit, and/or the ground speed control lever, and/or the control panel. This allows for a fast and flexible adaptation of the quick-select function during varying operating situations; the adaptation of a specific working unit in each case is required, with high priority, for the implementation thereof. Depending on the particular operating situation of the working machine, the focus of the operation lies on particular different units, the performance parameters of which require more frequent adaptation.

Preferably, a completed configuration change of the at least one quick-select function can be transferred via the control device to a control element of the display unit, the ground speed control lever, and/or the control panel. Therefore, a change to the loading of the particular control element carried out by the particular control element of one of the control components can be automatically transferred, with the aid of the preferred quick-select function, to the other control components and can be incorporated by these control components. As a result, an additional adaptation of the changed preferred quick-select function for the particular other components of the control system is eliminated.

Moreover, an actuation of the control element on the ground speed control lever or the control panel, to which the preferred quick-select function has been assigned, can bring about a corresponding change to the representation on the screen of the display unit.

For this purpose, a dialog box can be depictable in a visualization pane on the screen of the display unit by actuating the control element, which makes it possible to configure the performance parameters of the working machine assigned to the quick-select functions. The performance parameters which are available for parameterizing the different working units of the working machine and which correspond to the quick-select functions are visualized in the dialog box.

For this purpose, the selection of a quick-select function within the dialog box can take place by way of the actuation of at least one control element, which is designed, in particular, as a multiple-use control element, on the ground speed control lever or the control panel, or by touching the screen of the display unit via one of the quick-select function boxes displayed within the dialog box. The operator can therefore navigate within the dialog box in order to select a quick-select function which deviates from the preferred quick-select function. This selection makes it possible to change the loading of the particular control element with another preferred quick-select function. The navigation through the dialog box can take place in a continuously circulating manner, i.e., after the last quick-select function in the list of the quick-select functions has been reached within the dialog box, the process continues with the first quick-selection function, and vice versa.

Moreover, after a quick-select function has been selected, a settings menu can be unhidden, preferably within the dialog box. The settings menu makes it possible to change the performance parameter assigned to the quick-select function. The adjustment can take place with the aid of virtual buttons which can be depicted on the display unit, at least one control element of the control panel, or at least one control element on the ground speed control lever.

In this case, the change to the performance parameter can be carried out by touching virtual buttons depicted on the screen or by actuating at least one control element of the ground speed control lever or the control panel. Preferably, the control elements of the ground speed control lever and the control panel, which are provided for this purpose, can be designed as multiple-use control elements.

According to one advantageous refinement, the control device can be configured for automatically closing the display of the dialog box within a predefinable time window. Changes which have been made during the active display of the dialog box can be automatically stored, in this case, after the time window has elapsed.

In particular, a permanently represented display area can be provided on the screen, which is used, inter alia, for displaying a setting value of a parameter of a working unit assigned to the preferred quick-select function. In this way, the particular setting value which corresponds with the preferred quick-select function is apparent to the operator.

Moreover, the problem stated at the outset is solved by an agricultural working machine, in particular, a self-propelled harvesting machine, comprising a control system as claimed in one of claims 1 to 11. It is particularly preferred when the agricultural working machine is designed as a self-propelled combine harvester or forage harvester.

BRIEF DESCRIPTION OF THE DRAWINGS

The present invention is described in greater detail in the following with reference to an exemplary embodiment depicted in the drawings.

Wherein.

DETAILED DESCRIPTION OF THE EMBODIMENTS

Figure 1:
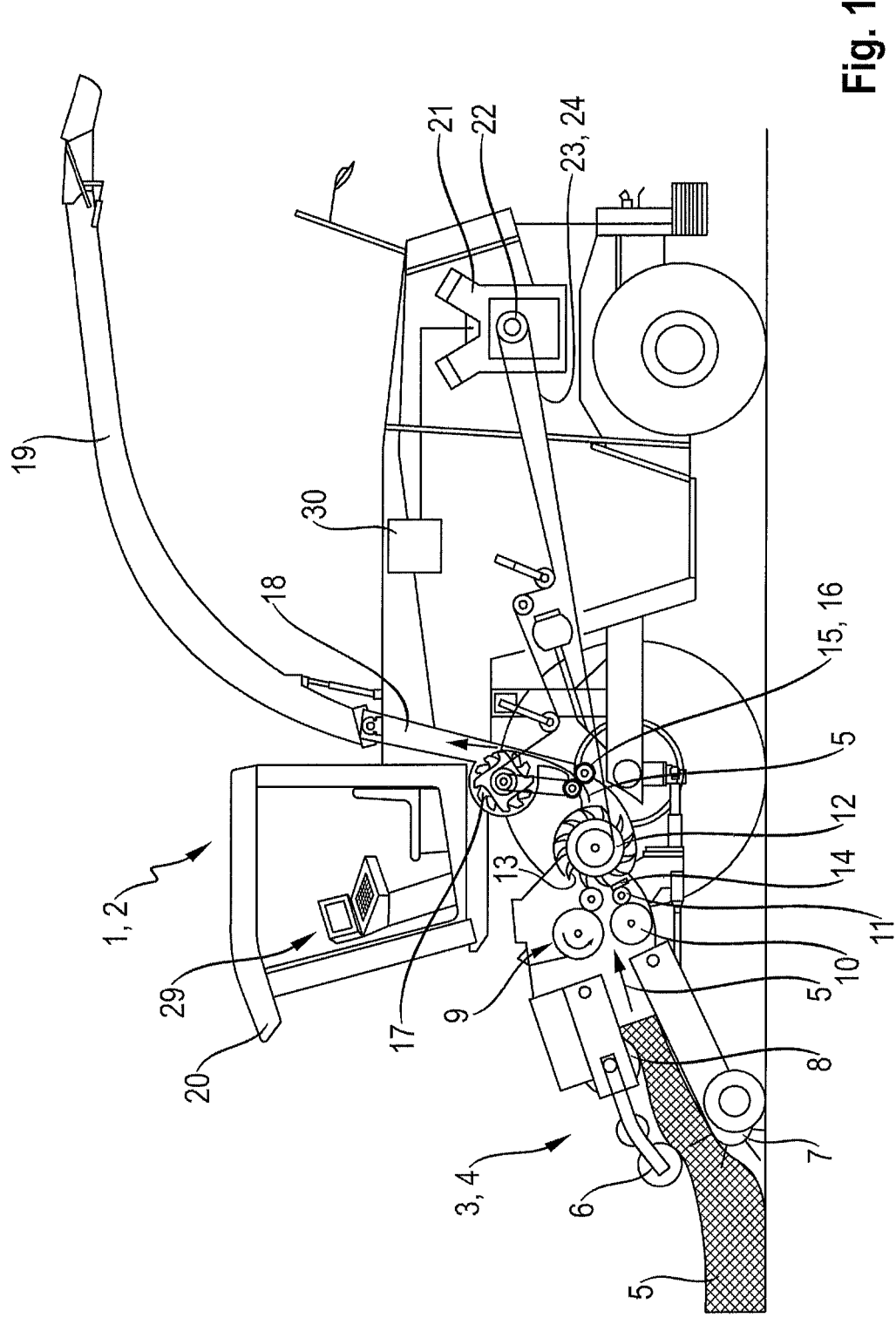
FIG. 1 shows a schematic side view of a working machine designed as a forage harvester.

FIG. 1 shows an agricultural working machine 1 designed as a forage harvester 2, in the front region of which a front attachment 3 designed as a pick-up 4 is accommodated. The pick-up 4 is configured in such a way that the pick-up 4 accommodates crop 5 between a hold-down device 6 and a pick-up drum 7 and, in the rear region of the pick-up 4, feeds crop 5 to a cross auger 8. The cross auger 8 transfers the crop 5 to downstream intake conveyor mechanisms 9, approximately in the center of the pick-up 4. In the exemplary embodiment shown, the intake conveyor mechanisms 9 are formed from feed rollers 10 disposed in pairs and compression rollers 11 disposed downstream therefrom. After the crop 5 has passed through the intake conveyor mechanisms 9, the crop 5 is transferred, in the rear region of the intake conveyor mechanisms 9, to a chopper drum 12. The chopper drum 12 comprises a plurality of chopper knives 13 on its circumference, which, in interaction with a shear bar 14, chop up the crop 5. Due to the kinetic energy of the revolving chopper drum 12, the crop 5 exits the chopper drum 12 in the rear region thereof at a high rate of speed and is transferred to cracker rollers 15 which are disposed in pairs. The cracker rollers 15 form a so-called rechopper 16 in this case. After the crop 5 has passed through the rechopper 16, the crop 5 enters the operating range of an accelerator 17. The accelerator 17 imparts additional kinetic energy to the crop 5 in a manner known per se, with the aid of which the crop 5 is ejected out of the forage harvester 2 via a lower discharge chute 18 pointing in the vertical direction and via a discharge spout 19 which is positioned downstream from the lower discharge chute 18 and is movable in a swiveling and rotating manner.

Moreover, at least one drive engine 21 is assigned to the forage harvester 2 and a drive belt 23 is wrapped around the output-side pulley 22 of the drive engine 21. The drive belt 23 forms a movable drive means of a drive train 24 for rotationally driving the working units of the forage harvester 2. A control system 29 is situated in a cab 20 of the forage harvester 2, with the aid of which performance parameters of the different working units of the forage harvester 2 can be adjusted and brought to the attention of an operator via visualization. Such a control system can be correspondingly utilized on a self-propelled combine harvester in order to be able to adjust and monitor its different working units.

Figure 2:
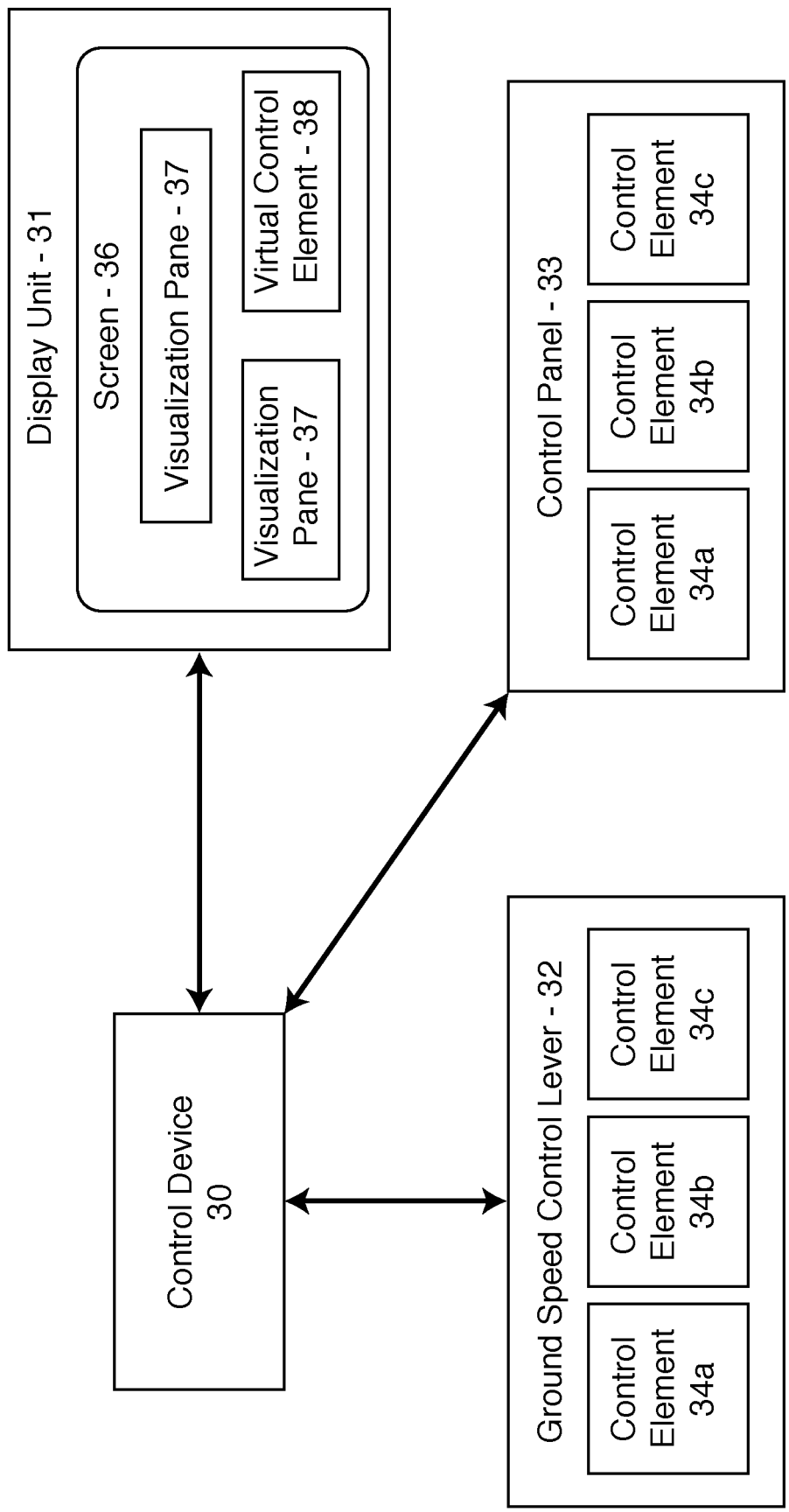
FIG. 2 shows a schematic representation of a control system for a working machine.

FIG. 2 shows a schematic representation of the control system 29 of the working machine 1. The control system 29 comprises a control device 30 which is connected, in terms of signals, to a display unit 31, a ground speed control lever 32, and a control panel 33. The control device 30 can also be preferably utilized for monitoring and controlling the working units. Multiple control elements 34*a*, 34*b*, 34*c* are situated on the ground speed control lever 32, at least two of which are designed as multiple-use control elements. The control panel 33 also comprises multiple control elements 35*a*, 35*b*, 35*c*. A preferred quick-select function is assigned to the control element 34*a* of the ground speed control lever 32 and to the control element 35*a* of the control panel 33 in order to be able to display and change a specific performance parameter of the forage harvester 2 directly on the display unit 31, bypassing a menu structure comprising multiple navigation levels. The control panel 33 can be, in particular, a component of the display unit 31. The display unit 31 comprises a touch-sensitive screen 36 including multiple visualization panes 37 for displaying different performance parameters of the forage harvester 2, and including at least one virtual control element 38 which is utilized for operation. In this case, a presently preferred quick-select function is assigned to the virtual control element 38 of the display unit 31. The design of the display unit 31 as well as the operation of the control system 29 will be discussed in greater detail in FIGS. 3 and 4 which follow.

The representation of the different performance parameters takes place in multiple, hierarchically stepped navigation levels, due to the complexity. The quick-select functions are provided for enabling access to a specific navigation level and, therefore, a lower navigation level. A quick-select function is understood to be the direct call of an operating dialog, which is specific for the control of the working machine 1, from within any navigation level, which makes it possible to adjust and change performance parameters of the particular working unit of the working machine 1. This direct access is relevant, in particular, during a harvesting operation of the working machine 1 when a single performance parameter or multiple performance parameters must be continuously adapted.

Figure 3:
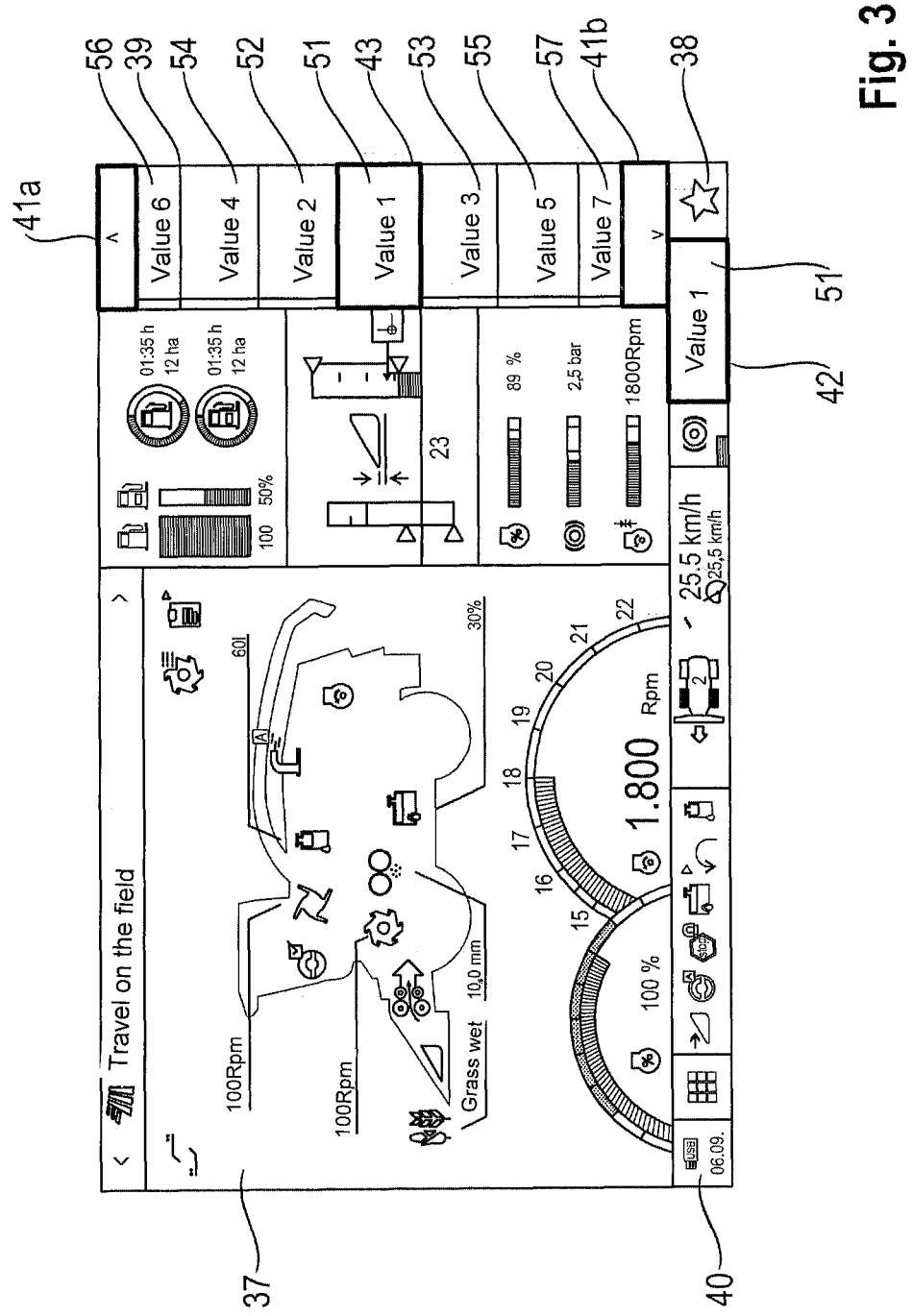
FIG. 3 shows a schematic representation of the display unit.

FIG. 3 shows a schematic representation of the display unit 31, on which a dialog box 39 is opened by actuating one of the control elements 34a, 35a or 38 of one of the control components ground speed control lever 32, control panel 33, or display unit 31, within which dialog box 39 different quick-select functions 51 to 57 are represented. The preferred quick-select function can be activated by way of an actuation of a control element of one of the control components, wherein the activation can take place via the ground speed control lever 32, and/or the control panel 33, and/or the display unit 31.

An initial selection of one of the quick-select functions 51 to 57, by way of which one of the control elements 34a, 35a or 38 of the control components ground speed control lever 32, control panel 33, or display unit 31, respectively, is loaded, takes place via a preconfiguration with the aid of the display unit 31. The preferred quick-select function 51 assigned to the control elements 34a, 35a and 38 is centrally positioned within the dialog box 39 and is marked as active. This can take place, for example, with the aid of color highlighting or an otherwise visually easily perceptible design. A border 43 is provided in the exemplary embodiment shown.

A display area 40, which is visible in all navigation levels, is positioned below the visualization pane 37. Information which is relevant to the working machine is permanently visualized in the display area 40. The display area 40 comprises a status field 42, in which the preconfigured or implemented assignment of a value of the performance parameter is represented in accordance with the preferred quick-select function 51. In this way, the operator has an overview, at all times, of the particular selected, preferred quick-select function, namely the quick-select function 51 in this case, which is assigned to the control elements 34a, 35a and 38 and can be activated via actuation of one of these control elements 34a, 35a, 38.

Moreover, virtual buttons 41a, 41b are represented in the dialog box 39, which enable navigation between the individual quick-select functions 51 to 57. Due to the representation in the form of a list, the quick-select functions 51 to 57 can be scrolled through in a continuously circulating manner. This means, proceeding from the presently preferred quick-select function 51, it is possible to jump ahead, by continuously actuating the virtual button 41a, to the quick-select function 56 which would be displayed within the border 43 before the process continues with the quick-select function 57 after a further actuation of the virtual button 41a. It is possible to navigate through the representation in the dialog box 39 in the identical way, although in the opposite direction, by actuating the virtual button 41b. The navigation through the quick-select functions 51 to 57 can be effectuated in the same way with the aid of the control elements 34b, 35b which are provided on the ground speed control lever 32 and the control panel 33, respectively, and are designed as multiple-use control elements.

Figure 4:
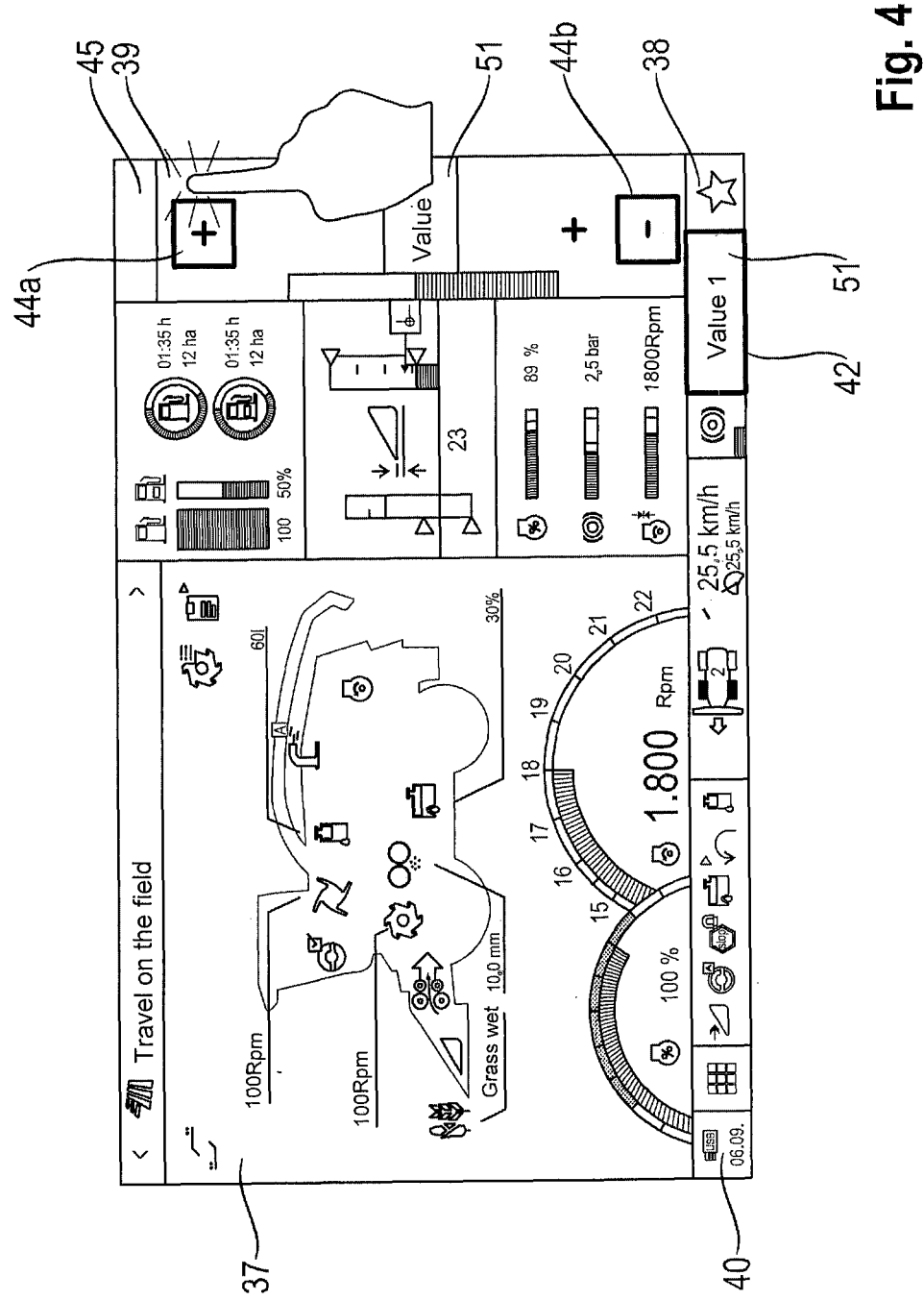
FIG. 4 shows a navigation level, which appears after actuation of a quick-select button in the dialog box, for adjusting a performance parameter of the working machine.

FIG. 4 shows the navigation level for adjusting the performance parameter assigned to the quick-select function 51, which appears after the actuation of the quick-select button 51 by touching the screen in the dialog box 39 in a targeted manner. Now, only the value of a performance parameter selected via the quick-select function 51 is displayed in the dialog box 39. The value can be increased or decreased by actuating virtual buttons 44a, 44b in the course of an adjustment and selection dialog.

Correspondingly, the value of a performance parameter selected via the quick-select function 51 can be increased or decreased by way of the control elements 34c, 35c of the ground speed control lever 32 and of the control panel 33, respectively, which are designed as multiple-use control elements. The reference character 45 designates a virtual button field of the display unit 31, which, upon actuation, results in an abort of the represented dialog, whereupon the process jumps back to a representation in the dialog box 39, which shows the quick-select functions 51 to 57, as represented in FIG. 3.

The incorporation of a newly selected quick-select function becomes effective in that the value for one of the quick-select functions 51 to 57 displayed within the border 43 is confirmed via touch. If the selection takes place with the aid of the control elements 34b, 35b of the ground speed control lever 32 or of the control panel 33, respectively, the selection is carried out by way of an actuation of the control element 34a or 35a. The performance parameter which is preferred due to the completed reassignment of the quick-access function is automatically represented in the status field 42 in the display area 40. In every case, after a selection has been changed and a new quick-select function has been confirmed as the preferred quick-select function, a reloading of the particular control elements 34a, 35a, 38, which was initiated by the control device, takes place. The preferred quick-select function can be activated with the aid of the particular control elements. This takes place regardless of whether the change was carried out via the display unit 31, the ground speed control lever 32, or the control panel 33.

According to one further aspect, it is provided that the control device 30 can be configured for automatically closing the display of the dialog box 39 within a predefinable time window. It can be provided in this case that a selection and/or adjustment carried out while the dialog field 39 was active is automatically incorporated and activated.

| List of reference characters: | |
|---|---|
| 1 | working machine |
| 2 | forage harvester |
| 3 | front attachment |
| 4 | pick-up |

List of reference characters:

| | |
|---|---|
| 5 | crop |
| 6 | hold-down device |
| 7 | pick-up drum |
| 8 | cross auger |
| 9 | intake conveyor mechanisms |
| 10 | feed rollers |
| 11 | compression rollers |
| 12 | chopper drum |
| 13 | chopper knife |
| 14 | shear bar |
| 15 | cracker rollers |
| 16 | rechopper |
| 17 | accelerator |
| 18 | lower discharge chute |
| 19 | discharge spout |
| 20 | cab |
| 21 | drive engine |
| 22 | pulley |
| 23 | drive belt |
| 24 | drive train |
| 29 | control system |
| 30 | control device |
| 31 | display unit |
| 32 | ground speed control lever |
| 33 | control panel |
| 34a | control element |
| 34b | control element |
| 34c | control element |
| 35a | control element |
| 35b | control element |
| 35c | control element |
| 36 | screen |
| 37 | visualization pane |
| 38 | virtual control element |
| 39 | dialog box |
| 40 | display area |
| 41a | virtual button |
| 41b | virtual button |
| 42 | status field |
| 43 | border |
| 44a | virtual button |
| 44b | virtual button |
| 45 | button field |
| 51 | quick-select function |
| 52 | quick-select function |
| 53 | quick-select function |
| 54 | quick-select function |
| 55 | quick-select function |
| 56 | quick-select function |
| 57 | quick-select function |

What is claimed is:

1. A control system for an agricultural working machine, comprising:
   a display unit designed as a touch-sensitive screen including at least one visualization pane, as well as a plurality of virtual control elements,
   a ground speed control lever comprising a plurality of control elements,
   a control panel having at least one control element, and
   a control device which is connected to the display unit, the ground speed control lever, and the control panel,
   wherein a preferred quick-select function that is selected from a plurality of different quick-select functions that are each configured for adjusting a performance parameter of the working machine is assigned, in a preconfigured manner, to one of the control elements, wherein the display unit is configured for depicting the performance parameter corresponding to the preferred quick select function upon activation, and wherein the display unit, the ground speed control lever, and the one control element are all configured for activating the quick select function assigned the one control element,
   wherein the display unit and the ground speed control lever and the control panel are configured for changing a preconfigured loading of the one control element with the preferred quick-select function and wherein the control device is configured for transferring a completed configuration change to the assignment of the preferred quick-select function to the one control element.

2. The control system as claimed in claim 1, wherein the control system Is configured such that an actuation of one of the control elements on the ground speed control lever or the control panel, to which the preferred quick-select function has been assigned, brings about a corresponding change to a representation on the screen of the display unit.

3. The control system as claimed in claim 1, wherein the preferred quick-select function is changeably assigned to the one control element.

4. The control system as claimed in claim 1, wherein one of the at least one visualization pane on the screen of the display unit is configured for displaying a dialog box by actuating the one control element, which makes it possible to configure the performance parameters of the working machine assigned to the quick-select functions.

5. The control system as claimed in claim 4, wherein selection of the quick-select function within the dialog box takes place by actuating at least one of the control elements on the ground speed control lever or on the control panel, or by touching the screen of the display unit of one of the performance parameters represented within the dialog box and assigned to the quick-select functions.

6. The control system as claimed in claim 5, wherein the display unit is configured such that when a quick-select function has been selected, a settings menu is unhidden within the dialog box, the settings menu making it possible to change the performance parameter assigned to the quick-select function.

7. The control system as claimed in claim 6, wherein the change to the performance parameter can be carried out by touching the virtual control elements depicted on the screen or by actuating at least one control element of the ground speed control lever or the control panel, the at least one control element being designed as a multiple-use control element.

8. The control system as claimed in claim 4, wherein the control device is configured for automatically closing the display of the dialog box within a predefinable time window.

9. The control system as claimed in claim 1, wherein a permanently represented display area is provided on the screen, and is configured for displaying a setting value of a performance parameter of the working machine assigned to the preferred quick-select function.

10. An agricultural working machine comprising a front attachment, a drive engine, a cab, and a control system as claimed in claim 1.

* * * * *